United States Patent
Spillane et al.

(10) Patent No.: US 10,445,409 B2
(45) Date of Patent: Oct. 15, 2019

(54) SYSTEM AND METHOD OF SUPPORTING USER LEVEL FILE SYSTEM TRANSACTIONS USING BATCH RENAME AND FILE CLONES

(71) Applicant: VMware, Inc., Palo Alto, CA (US)

(72) Inventors: Richard P. Spillane, Mountain View, CA (US); Yunshan Lu, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 480 days.

(21) Appl. No.: 14/973,415

(22) Filed: Dec. 17, 2015

(65) Prior Publication Data

US 2017/0177574 A1 Jun. 22, 2017

(51) Int. Cl.
  *G06F 17/22* (2006.01)
  *G06F 16/18* (2019.01)
  *G06F 16/11* (2019.01)

(52) U.S. Cl.
  CPC .......... *G06F 17/2235* (2013.01); *G06F 16/11* (2019.01); *G06F 16/1865* (2019.01)

(58) Field of Classification Search
  CPC combination set(s) only.
  See application file for complete search history.

(56) References Cited

U.S. PATENT DOCUMENTS

| | | | |
|---|---|---|---|
| 7,257,690 B1 * | 8/2007 | Baird | G06F 11/1471 707/999.202 |
| 2007/0162515 A1 * | 7/2007 | Sarma | G06F 17/30067 |
| 2016/0070652 A1 * | 3/2016 | Sundararaman | G06F 3/0619 711/154 |
| 2016/0103866 A1 * | 4/2016 | Robinson | G06F 17/30371 707/703 |

OTHER PUBLICATIONS

Transaction support in a log-structured file system, Harvard UniversityDivision of Applied Sciences Seltzer 1993 IEEE.*
User-level opearting system transaction Software—Practice and Experience 2009:00-1-18 (Version 2002/09/23 v2.2.*

* cited by examiner

*Primary Examiner* — Shyue Jiunn Hwa
(74) *Attorney, Agent, or Firm* — Loza & Loza, LLP

(57) ABSTRACT

System and method for supporting a user-level file system transaction use cloned files of original existing files specified in the user-level file system transaction to perform file system operations on at least one of the original existing files using the cloned files, which include metadata of the original existing files. After at least one of the cloned files have been modified, a batch rename operation is executed to atomically commit every modified cloned file of the user-level file system transaction.

20 Claims, 10 Drawing Sheets

SYSTEM AND METHOD OF SUPPORTING USER LEVEL FILE SYSTEM TRANSACTIONS USING BATCH RENAME AND FILE CLONES

BACKGROUND

Certain applications may require modification of a large set of files and/or directories in a file system for a single transaction. In these types of user-level file system transactions, the different file system operations for a single transaction should be atomic to reduce the likelihood of an inconsistent state in the event of system/application crash or concurrent access.

However, current solutions to support a full range of file system operations in a transaction-based context are complex and require customization. As an example, some solutions may require the use of logs to keep track of the different file system operations being performed. In addition, some solutions may require making copies of files, which can significantly increase the overall transaction time and consume storage resources.

BRIEF DESCRIPTION OF THE DRAWINGS

Throughout the description, similar reference numbers may be used to identify similar elements.

DETAILED DESCRIPTION

Figure 1:
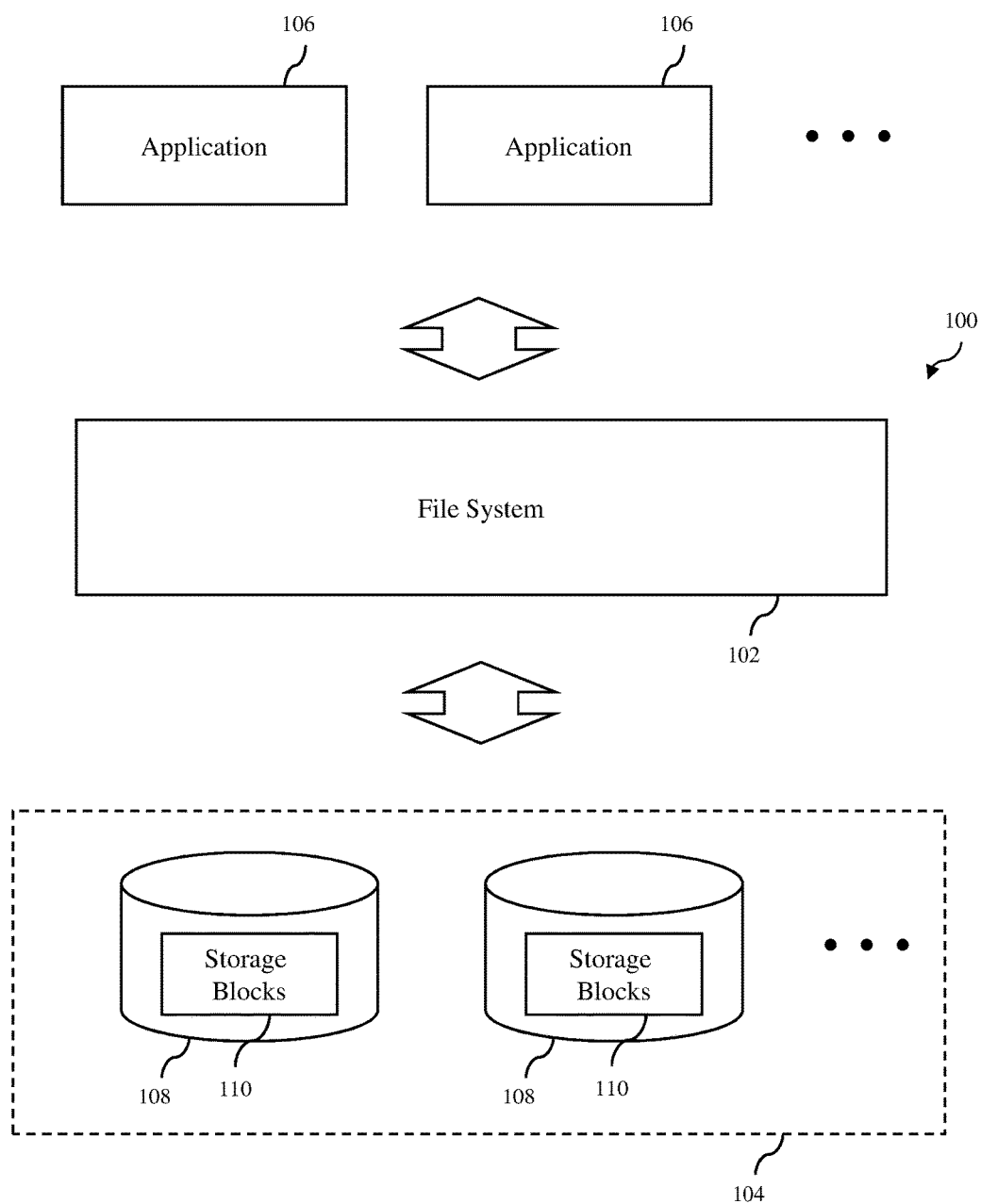
FIG. 1 is a block diagram of a computer system in accordance with an embodiment of the invention.

FIG. 1 depicts a computer system 100 in accordance with an embodiment of the invention. The computer system is shown to include a file system 102 and a storage system 104. Other components of the computer system that are commonly found in a conventional computer system, such as memory and one or more processors, are not shown in FIG. 1. The computer system allows applications 106 to execute user-level file system transactions to modify a set of files or directories/folders being managed by the file system, and then at the end commit all changes atomically or abort everything without changing the state of the file system. As further described below, the user-level file system transactions supported by the computer system are performed without having to maintain complex log files and/or without having to physically copy contents of files that are being manipulated.

The applications 106 can be any software program that can run on the computer system 100, which can be a physical computer, a virtual computer, such as a VMware virtual machine, or a distributed computer system. The applications may perform numerous file system operations, such as read, write, delete, and rename operations, for a single transaction. Information associated with the file system operations is stored in the storage system 104.

The storage system 104 includes one or more computer data storage devices 108, which are used by the computer system 100 to store data. The data storage devices can be any type of non-volatile storage devices that are commonly used for data storage. As an example, the data storage devices may be, but not limited to, solid-state devices (SSDs), hard disks or a combination of the two. The storage space provide by the data storage devices is divided into storage blocks 110, which may be disk blocks, disk sectors or other storage device sectors.

In an embodiment, the storage system 104 may be a local storage system of the computer system 100, such as hard drive disks in a personal computer system. In another embodiment, the storage system may be a remote storage system that can be accessed via a network, such as a network-attached storage (NAS). In still another embodiment, the storage system may be a distributed storage system such as a storage area network (SAN) or a virtual SAN. Depending on the embodiment, the storage system may include other components commonly found in those types of storage systems, such as network adapters, storage drivers and/or storage management servers. The storage system may be scalable, and thus, the number of data storage devices 108 included in the storage system can be changed as needed to increase or decrease the capacity of the storage system to support increase/decrease in workload. Consequently, the exact number of data storage devices included in the storage system can vary from one to hundreds or more.

The file system 102 operates to present storage resources of the storage system 104 as one or more file system structures, which include hierarchies of file system objects, such as file system volumes, file directories/folders, and files, for shared use of the storage system. Thus, the file system organizes the storage resources of the storage system into the file system structures so that the applications can access the file system objects for various file system operations, such as creating file system objects, deleting file system objects, writing or storing file system objects, reading or retrieving file system objects and renaming file system objects.

The file system 102 maintains storage metadata of the data stored in the storage system 104. As used herein, the data of the file system stored in the storage system is content, such as the contents of files, and the storage metadata describes that content with respect to its characteristics and physical storage locations. Thus, the storage metadata is information that describes the stored data, such as names, file paths, modification dates and permissions. The storage metadata can also be stored in the storage system or any other storage accessible by the file system. In a distributed file system architecture, the storage metadata may be stored in multiple metadata servers located at different storage locations.

The file system 102 is programmed or configured to create clones of files, directories/folders or volumes when needed. As used herein, a clone of a stored data portion or "file system clone", which can be a single file, a set of files, a single folder/directory, a set of folders/directories, a single volume, a set of volumes or any portion of content stored in the storage system, is only a copy of at least some of the storage metadata for the storage data portion. That is, a clone of a storage data portion does not include the contents of the storage data portion. In an embodiment, a clone of a storage data portion includes metadata that points to the contents of the storage data portion. The clone of a storage data portion is used by the file system to perform a file system operation on the storage data portion. Thus, in order to manipulate a stored data portion for a file system operation, the actual data stored in the storage system, e.g., bits stored in the blocks 110 of the storage system 104, do not have to be copied. Rather, a clone of the stored data portion can be created, and then any manipulation of the stored data portion can be performed using the clone. This process will be further described below using a word processing file as an example.

Figure 2A:
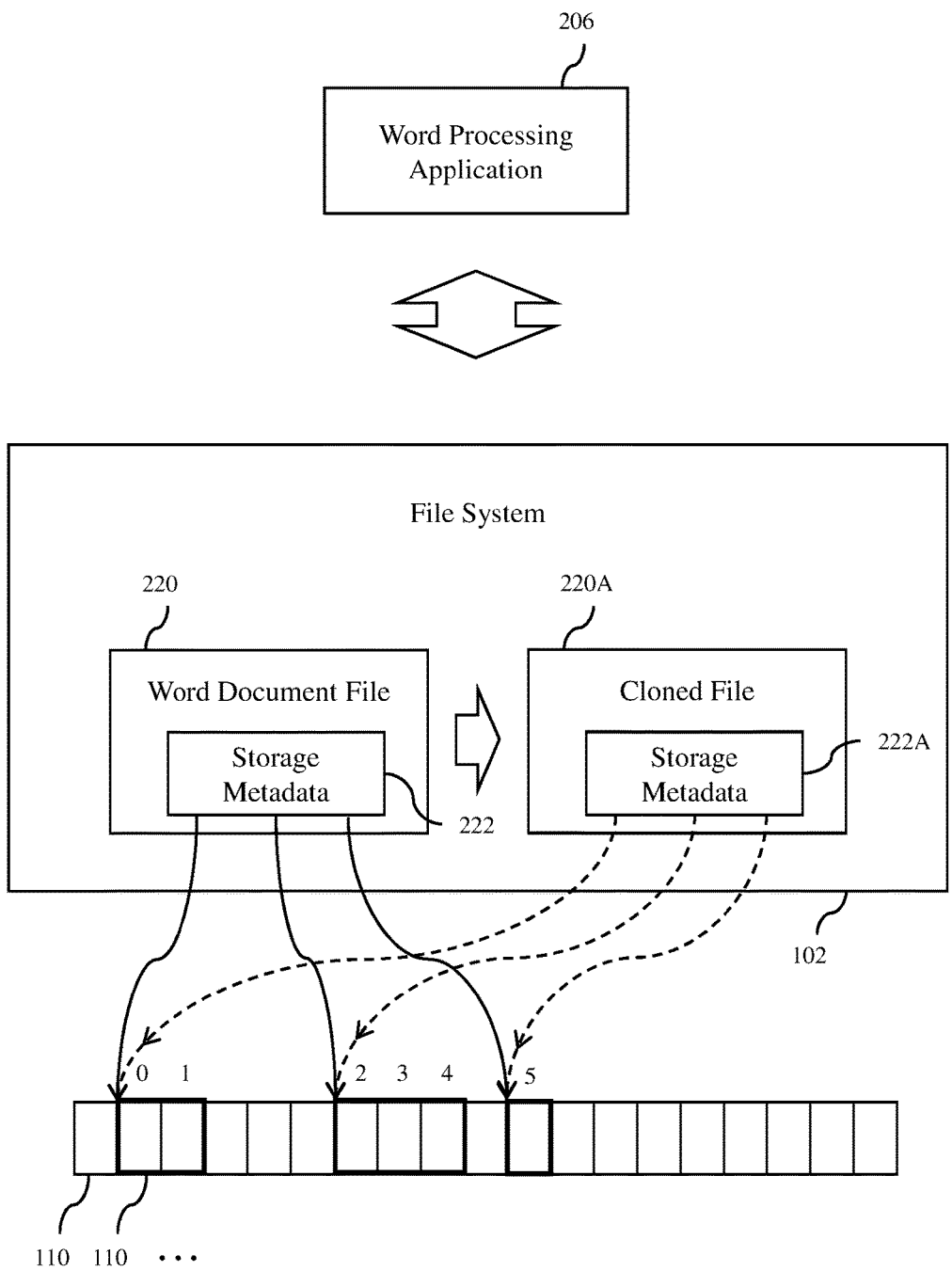
FIGS. 2A and 2B illustrate a word processing application using a file system of the computer system in accordance with an embodiment of the invention.

FIG. 2A shows a word processing application 206 using the file system 102 in accordance with an embodiment of the invention. In this example, the word processing application is operating on a word document file 220, which includes data stored in a number of blocks 110 in the storage system 104. For illustrative purposes, the data or contents of the word document file is shown to be stored in blocks 0, 1, 2, 3, 4 and 5. The word document file also includes storage metadata 222 that describes the stored data. When the word processing application selects the word document file, the file system creates a clone 220A of the word document file. This cloned file is a snapshot of the word document file, which includes a copy 222A of the storage metadata for the word document file. Thus, the cloned file also points to blocks 0, 1, 2, 3, 4 and 5. However, the cloned file does not include a copy of the data stored in the blocks of the storage system. That is, the contents of the blocks 0, 1, 2, 3, 4 and 5 are not copied for the cloned file. In a conventional file system, in order for the word processing application to operate on the word document file, the storage metadata as well as the data stored in the blocks in the storage system would be copied as a temporary file so that modifications can be made on the temporary file. In the file system 102, any modification of the word document file can now be applied using the cloned file 220A, which may involve storing additional data in blocks of the storage system or deleting/disassociating some data stored in the blocks of the storage system. In an embodiment, copy-on-write can be performed on the cloned file to modify the cloned file while preserving the content of the original word document file, which is illustrated in FIG. 2B.

Figure 2B:
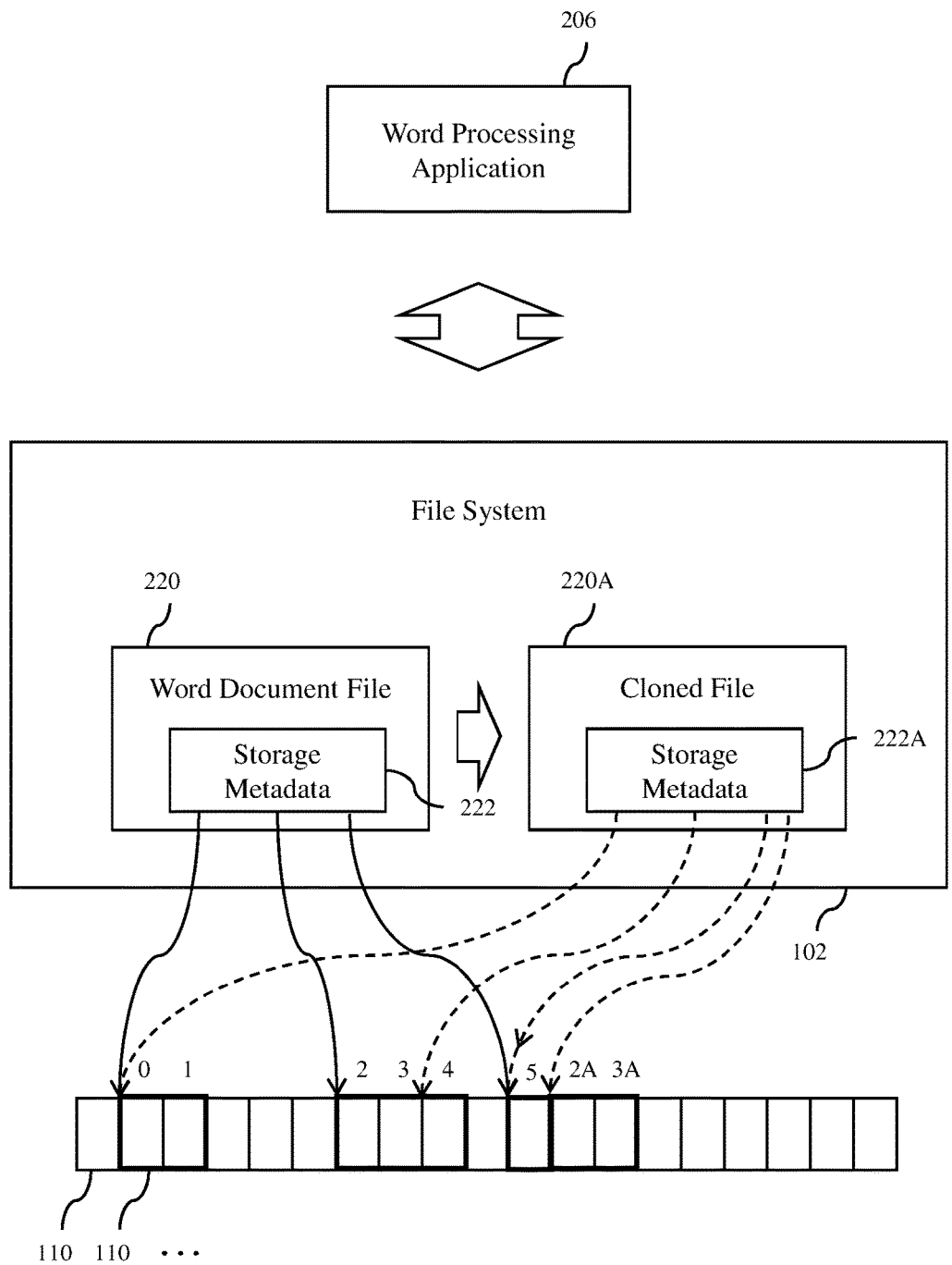

In FIG. 2B, the cloned file 220A has been modified so that the cloned file still points to blocks 0, 1, 4 and 5. However, the cloned file now points to blocks 2A and 3A rather than the blocks 2 and 3 to which the original word document file 220 still points. Thus, the contents of the original word document file are not modified. These differences between the pointers of the original file and the cloned file are maintained in the storage metadata 222A of the cloned file until the original word document file is replaced by the cloned file by renaming the cloned file with the name of the original word document file.

In addition to creating clones of stored data portions to be used as temporary file objects for modifications, the file system 102 facilitates an atomic process for user-level file system transactions in which each transaction includes file system operations on multiple file system objects. The file system utilizes a batch rename mechanism to atomically commit the different file system operations with respect to the multiple clones for a single user-level file system transaction. In an embodiment, the application creates extended attributes in the file system for each of the cloned files being manipulated to indicate which files or directories shall be included in a single user-level file system transaction in the file system. These extended attributes may be referenced together so that modified cloned files can be atomically committed. In some embodiments, the extended attributes may be configured as a linked list. In other embodiments, the extended attributes may be stored in the same file.

Figure 3:
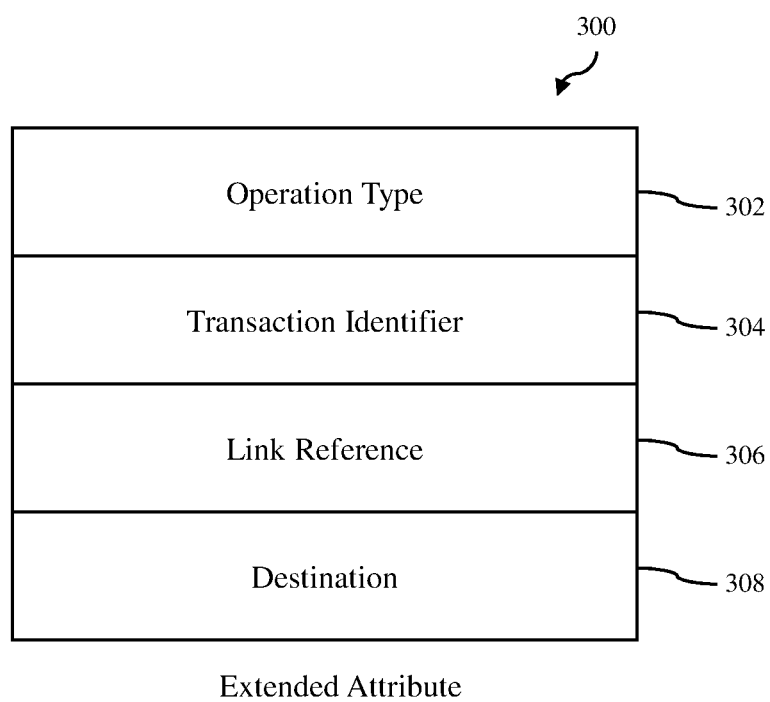
FIG. 3 illustrates a linked extended attribute of a cloned file used by the file system for a user-level file system transaction in accordance with an embodiment of the invention.

FIG. 3 illustrates a linked extended attribute 300 of a cloned file used by the file system 102 for a user-level file system transaction. As shown in FIG. 3, the linked extended attribute includes an operation type 302, a transaction identifier 304, a link reference 306 and a destination 308 for the cloned file. The operation type identifies the operation for the extended attribute, such as rename and delete. The transaction identifier specifies the user-level file system transaction to which the extended attribute belong. As an example, the transaction identifier may be a numerical value that particularly identifies the user-level file system transaction. The link reference provides the link to the linked extended attribute of another cloned file for the user-level file system transaction. In one implementation, the link reference may only reference the next cloned file being manipulated for the common user-level file system transaction. This would create a circular linked list of the extended attributes. In another implementation, the link reference may reference the next cloned file being manipulated for the common user-level file system transaction, as well as the previous cloned file being manipulated for the common user-level file system transaction. This would create a doubly linked list of the extended attributes. The destination specifies the location to which the cloned file will be placed. The destination may be the file path for the original file of the cloned file.

In an embodiment, the file system can use the following algorithm to handle a user-level file system transaction of an application that includes a set of original files, origFiles.

```
BeginTransaction( )
{
    for (each file in origFiles) {
        Clone(newFile, origFile);
    }
}
Modify cloned files;
CommitOrAbortTransaction( )
{
    if (commit) {
        RenameClonedFilesToOrigFiles( );
    } else {
        DeleteClonedFiles( );
    }
}
```

The above algorithm executed by the file system 102 includes a BeginTransaction routine, which creates a clone for each file in the set of original files. After the cloned files have been created, the cloned files are modified in response to instructions from the application. After all the requested modifications have been completed, a CommitOrAbortTransaction routine is executed, in which either all the cloned files are renamed to the names of the original files (commit) or the cloned files are deleted (abort).

Figure 4:
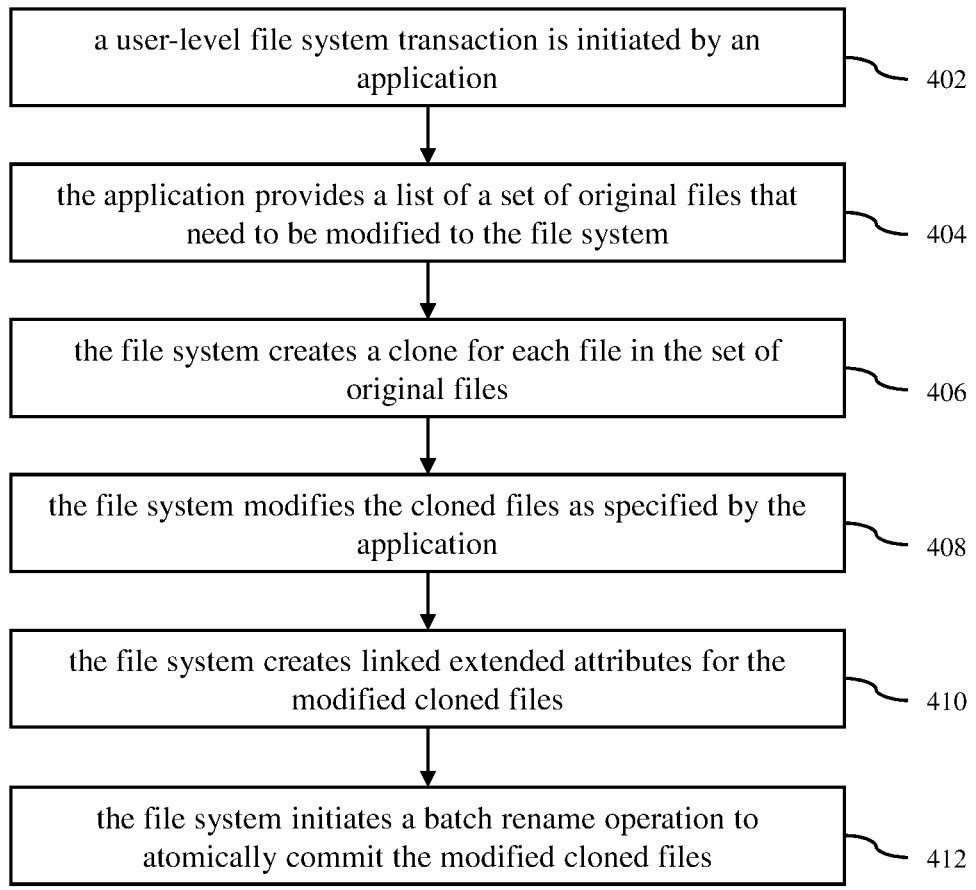
FIG. 4 is a process flow diagram of the operation of the file system for handing a user-level file system transaction in accordance with an embodiment of the invention.
Figure 5A:
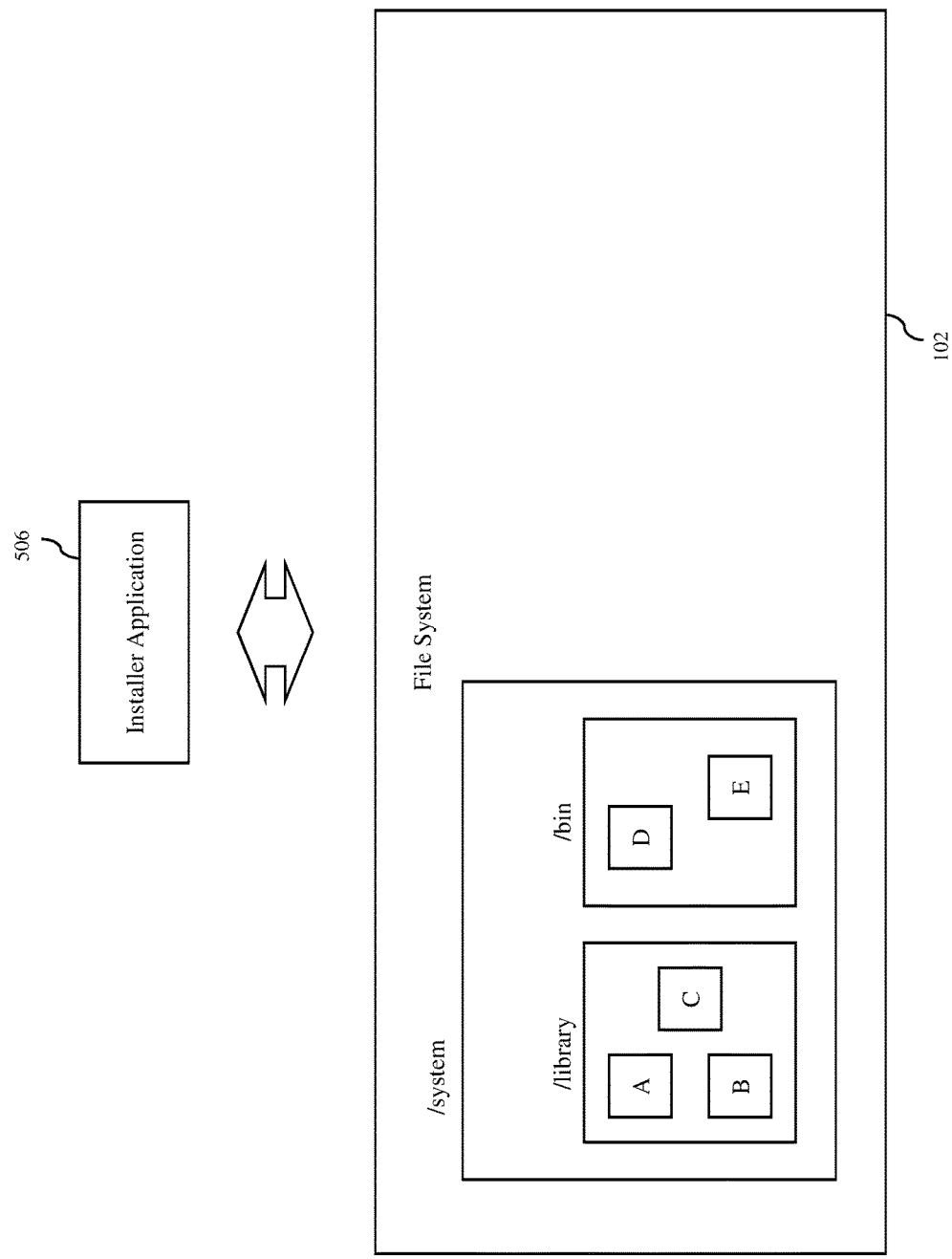
FIGS. 5A, 5B and 5C illustrate a user-level file system transaction for an installer application being handled by the file system in accordance with an embodiment of the invention.

The operation of the file system 102 for handing a user-level file system transaction in accordance with an embodiment of the invention is now described with reference to a process flow diagram of FIG. 4 using an example of an installer application executing an installation file system transaction as part of an installation process. At block 402, a user-level file system transaction is initiated by an application. As an example, as shown in FIG. 5A, an installer application may 506 initiate an installation file system transaction.

Next, at block 404, the application provides a list of a set of original files (existing files) that need to be modified to the file system 102. In the example, as shown in FIG. 5A, a set of original files that need to be modified includes files A, B and C in a library directory, and files D and E in a bin directory. Thus, the installer application 506 would provide a list of these files to the file system.

Figure 5B:
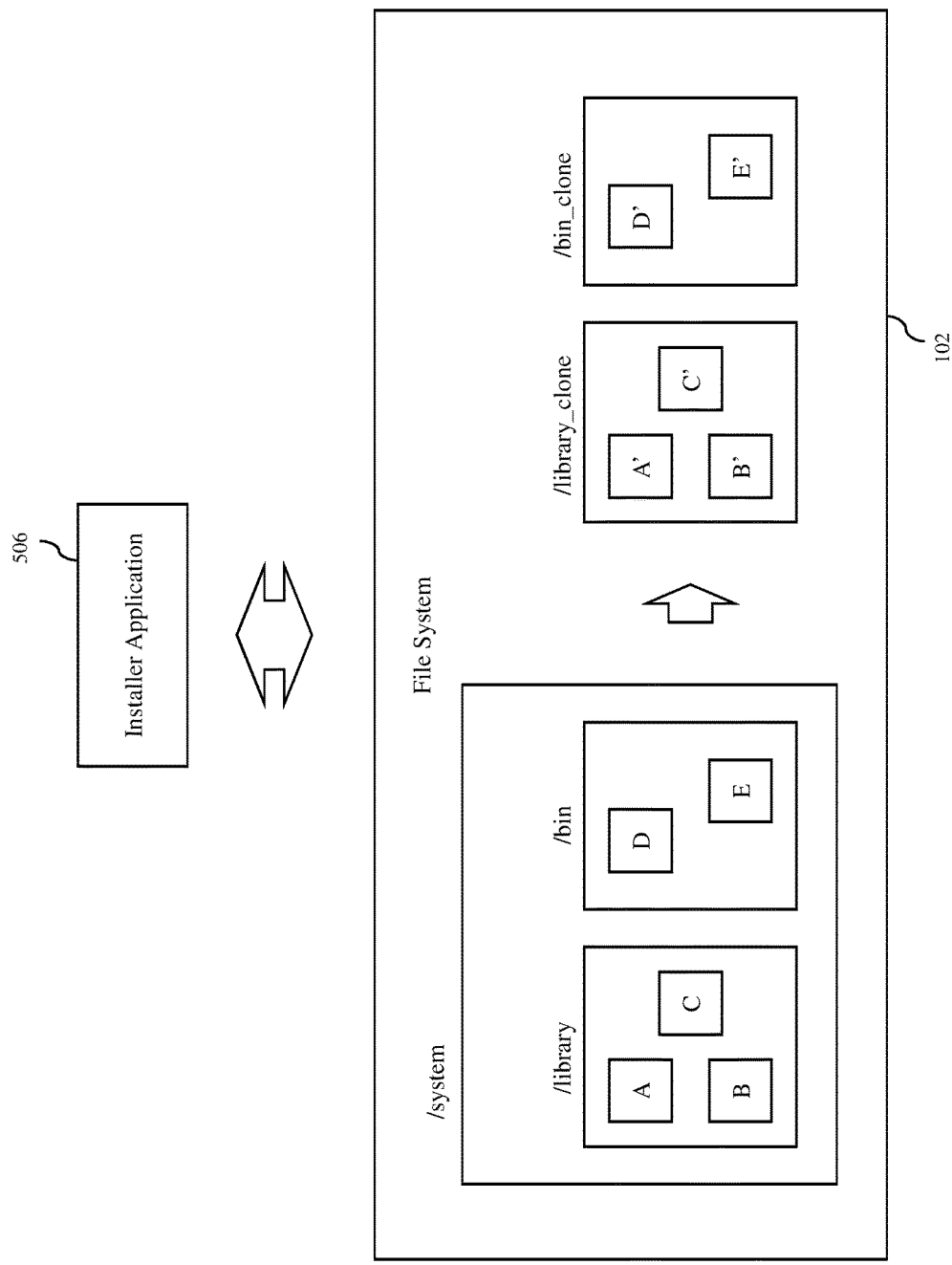

Next, at block 406, the file system 102 creates a clone for each file in the set of original files. In some embodiments, an entire directory or volume may be cloned to create the cloned files. In the example, as shown in FIG. 5B, the file system would create clones of files A, B, C, D and E as files A', B', C', D' and E'. Each of these cloned files would point to the same block or blocks 110 in the storage system 104 as the original files where the contents of the original files are stored.

Next, at block 408, the file system 102 modifies the cloned files as specified by the application. In the example, the file system modifies the cloned files A', B', C', D' and E'.

Figure 5C:
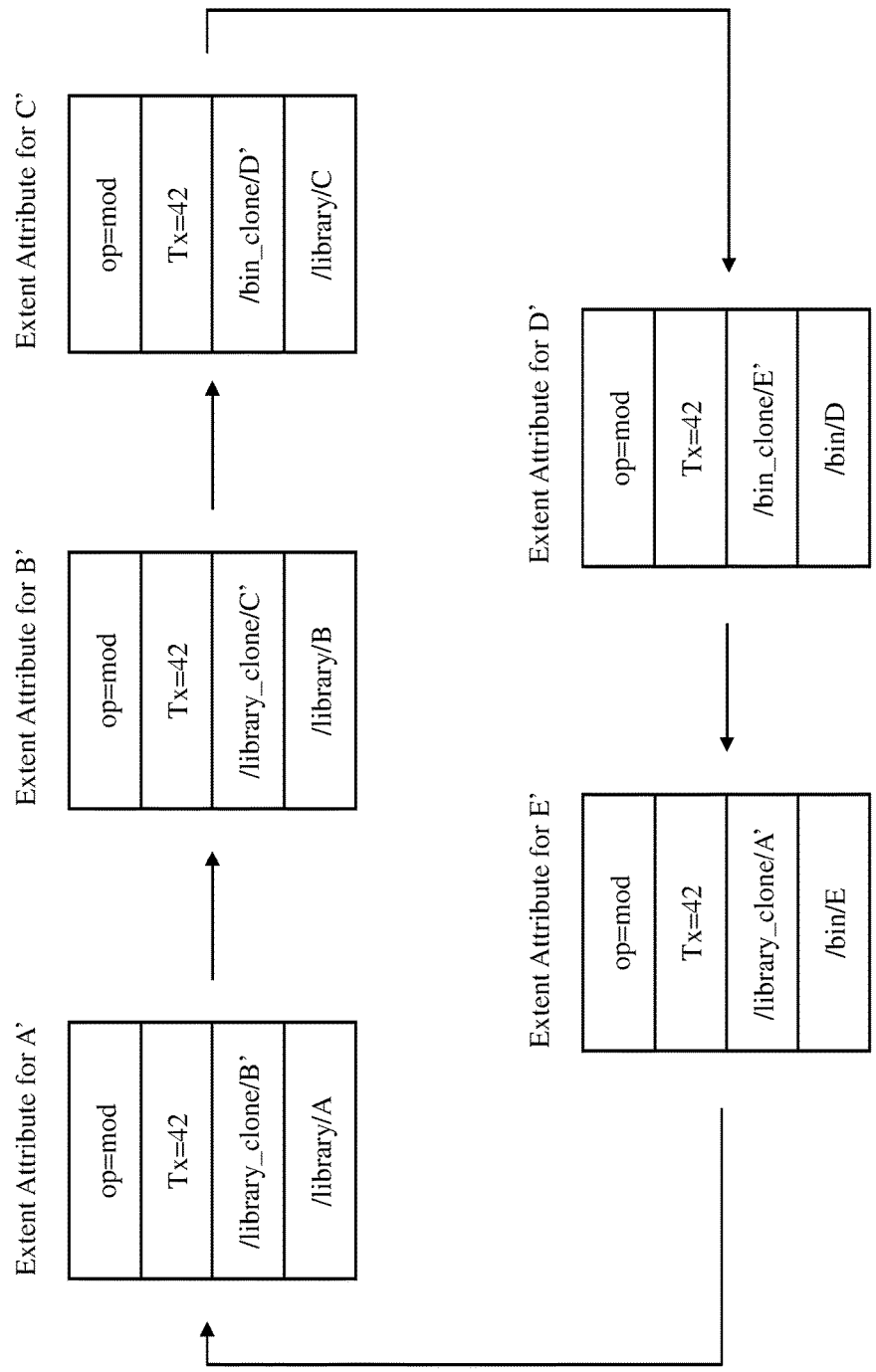

Next, at block 410, the file system 102 creates linked extended attributes for the modified cloned files. In the example, as shown in FIG. 5C, linked extended attributes are created for the modified cloned files A', B', C', D' and E'. These linked extended attributes are configured as a circular linked list. However, in other embodiments, these linked extended attributes may be configured as a doubly linked list, or a circular doubly linked list.

Next, at block 412, the file system 102 initiates a batch rename operation to atomically commit the modified cloned files. The atomic commitment of modified cloned files may be achieved using, e.g., write-ahead logging, a log structure or shadow paging. In the example, as shown in FIG. 5C, the file system initiates a batch rename, which could be a system call, to perform the file system operations specified in the linked extended attributes for the modified cloned files A', B', C', D' and E' in an atomic manner. Thus, in the event of any error, the process is aborted and the original files are preserved to maintain the original consistent state of the file system. If the CommitOrAbortTransaction step was performed when error happened, all cloned files will be removed. If the system crashed before the CommitOrAbortTransaction step was performed, the cloned files are left over in the file system. These left over files are usually harmless (because they are usually created in some special directories holding temporary files) and should be cleaned up by the application which created the cloned files.

The technique used by the file system 102 to support user-level file system transactions is less complex and faster than convention techniques. This is partly due to the fact that complex logs are not required and contents of files being modified are not copied during the process. In addition, the inventive technique does not require customization for different applications, as is the case in some conventional file systems.

Figure 6:
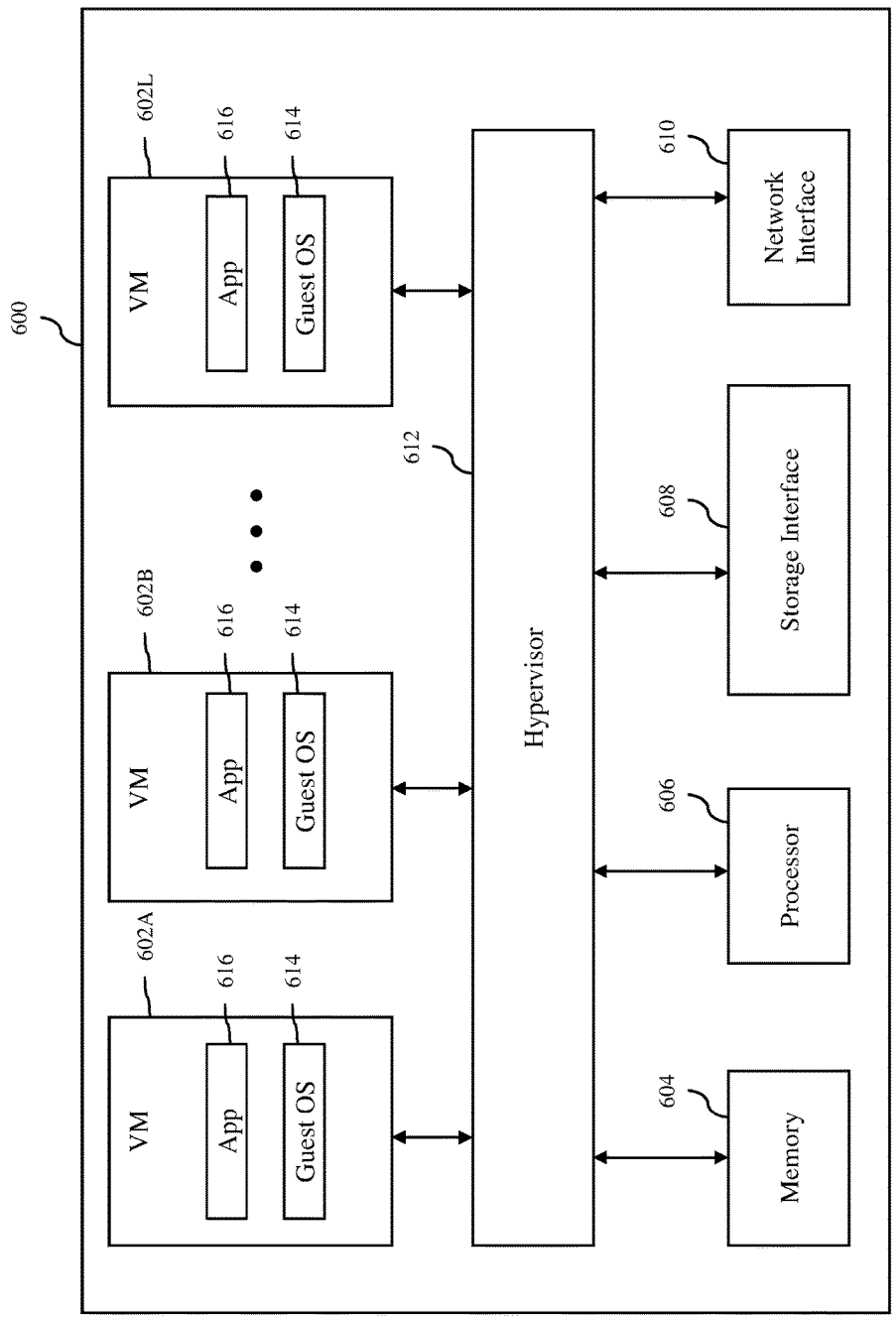
FIG. 6 is a block diagram of a physical computer system with a number of virtual machines in which the file system in accordance with an embodiment of the invention may be implemented.

The file system 102 is typically part of an operating system (OS) of a computer system, which may be a physical computer system, such as a physical server, or a virtual computer system, such as a virtual machine. Turning now to FIG. 6, a physical computer system 600 in which the file system may be implemented is shown. In FIG. 6, the physical connections between the various components of the computer system are not illustrated. As shown in FIG. 6, the physical computer system is configured to support a number of virtual machines (VMs) 602A, 602B . . . 602L (where L is a positive integer). The number of VMs supported by the physical computer system can be anywhere from one to more than one hundred. The exact number of VMs supported by the physical computer system is only limited by the physical resources of the physical computer system. The VMs share at least some of the hardware resources of the physical computer system, which include one or more system memories 604, one or more processors 606, a storage interface 608, and a network interface 610. Each system memory, which may be random access memory (RAM), is the volatile memory of the physical computer system. Each processor can be any type of a processor, such as a central processing unit (CPU) commonly found in a personal computer. The storage interface is an interface that allows that physical computer system to communicate with one or more physical storage systems. As an example, the storage interface may be a host bus adapter or a network file system interface. The network interface is an interface that allows the physical computer system to communicate with other devices through one or more computer networks. As an example, the network interface may be a network adapter.

In the illustrated embodiment, the VMs 602A, 602B . . . 602L run on "top" of a hypervisor 612, which is a software interface layer that, using virtualization technology, enables sharing of the hardware resources of the physical computer system 600 by the VMs. However, in other embodiments, one or more of the VMs can be nested, i.e., a VM running in another VM. Any computer virtualization architecture can be implemented. For example, the hypervisor may run on top of the physical computer system's operating system or directly on hardware of the physical computer system. With the support of the hypervisor, the VMs provide isolated execution spaces for guest software. Each VM may include a guest operating system 614, one or more guest applications 616. The guest operating system manages virtual system resources made available to the corresponding VM by the hypervisor, and, among other things, the guest operating system forms a software platform on top of which the guest applications run.

The file system 102 may be implemented in one or more VMs 602A, 602B . . . 602L running in the physical computer system 600 as part of their OS, i.e., the guest OS 614. Thus, in this implementation, the file system allows guest applications 616 to access physical storage systems available to the physical computer system. The file system may also be implemented in the physical computer system as part of the host OS. Thus, the file system may be implemented in the OS of any physical or virtual computer system.

Figure 7:
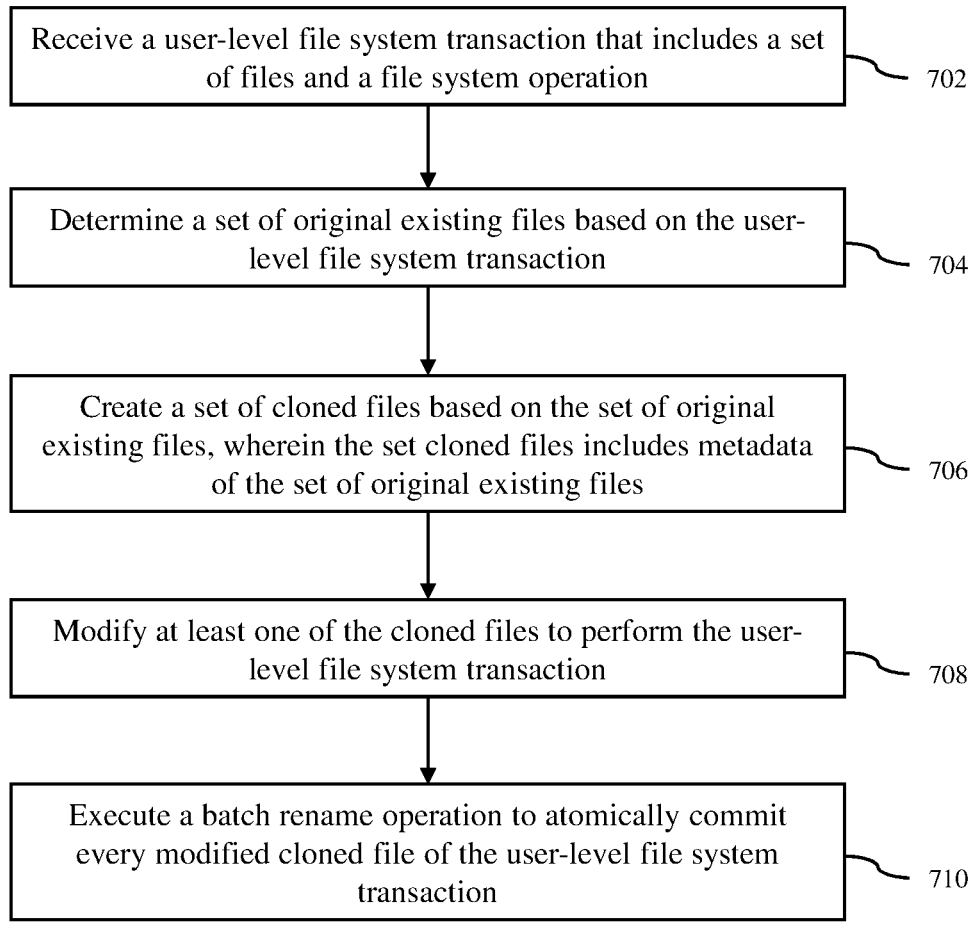
FIG. 7 is a flow diagram of a method for supporting a user-level file system transaction for a computer system in accordance with an embodiment of the invention.

A method for supporting a user-level file system transaction for a computer system in accordance with an embodiment of the invention is now described with reference to the process flow diagram of FIG. 7. At block 702, a user-level file system transaction that includes a set of files and a file system operation is received. Next, at block 704, a set of original existing files based on the user-level file system transaction is determined. Next, at block 706, a set of cloned files based on the set of original existing files is created. The set cloned files includes metadata of the set of original existing files. Next, at block 708, at least one of the cloned files is modified to perform the user-level file system transaction. Next, at block 710, a batch rename operation is executed to atomically commit every modified cloned file of the user-level file system transaction.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. Also, some of the steps can be repeated multiple times.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The components of the embodiments as generally described in this document and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for supporting a file system transaction for a computer system, the method comprising:
    receiving a file system transaction that includes a set of files and a file system operation;
    determining a set of original existing files based on the file system transaction;
    creating a set of cloned files based on the set of original existing files, wherein the set of cloned files includes metadata of the set of original existing files that points to same stored data blocks of the original existing files;
    modifying at least one of the cloned files to perform the file system transaction; and
    executing a batch rename operation to atomically commit every modified cloned file of the file system transaction.

2. The method of claim 1, further comprising creating extended attributes for modified cloned files.

3. The method of claim 2, wherein each of the extended attributes includes a transaction identifier, an operation identifier, a link reference and a destination for a corresponding cloned file.

4. The method of claim 3, wherein the link reference specifies at least one of a next modified cloned object and a previous modified cloned file.

5. The method of claim 1, wherein the executing the batch rename operation includes renaming every modified cloned file of the file system transaction to the name of the respective original file.

6. The method of claim 5, wherein the executing the batch rename operation includes aborting the file system transaction when every modified cloned file of the file system transaction is not renamed and deleting the cloned files.

7. The method of claim 1, wherein the creating the set of cloned files of the original existing files specified in the file system transaction does not include copying stored contents of the original existing files.

8. A non-transitory computer-readable storage medium containing program instructions for a method for supporting a file system transaction for a computer system, wherein execution of the program instructions by one or more processors of the computer system causes the one or more processors to perform steps comprising:

receiving a file system transaction that includes a set of files and a file system operation;

determining a set of original existing files based on the file system transaction;

creating a set of cloned files based on the set of original existing files, wherein the set of cloned files includes metadata of the set of original existing files that points to same stored data blocks of the original existing files;

modifying at least one of the cloned files to perform the file system transaction; and executing a batch rename operation to atomically commit every modified cloned file of the file system transaction.

9. The non-transitory computer-readable storage medium of claim 8, wherein the steps further comprise creating extended attributes for modified cloned files.

10. The non-transitory computer-readable storage medium of claim 9, wherein each of the extended attributes includes a transaction identifier, an operation identifier, a linked reference and a destination for a corresponding cloned file.

11. The non-transitory computer-readable storage medium of claim 10, wherein the linked reference specifies at least one of a next modified cloned object and a previous modified cloned file.

12. The non-transitory computer-readable storage medium of claim 8, wherein the executing the batch rename operation includes renaming every modified cloned file of the file system transaction to the name of the respective original file.

13. The non-transitory computer-readable storage medium of claim 12, wherein the executing the batch rename operation includes aborting the file system transaction when every modified cloned file of the file system transaction is not renamed and deleting the cloned files.

14. The non-transitory computer-readable storage medium of claim 8, wherein the creating the set of cloned files of the original existing files specified in the file system transaction does not include copying stored contents of the original existing files.

15. A computer system comprising:

memory;

at least one processor configured to:

receive a file system transaction that includes a set of files and a file system operation;

determine a set of original existing files based on the file system transaction;

create a set of cloned files based on the set of original existing files, wherein the set of cloned files includes metadata of the set of original existing files that points to same stored data blocks of the original existing files;

modify at least one of the cloned files to perform the file system transaction; and execute a batch rename operation to atomically commit every modified cloned file of the file system transaction.

16. The computer system of claim 15, wherein the at least one processor is configured to create extended attributes for modified cloned files.

17. The computer system of claim 16, wherein each of the extended attributes includes a transaction identifier, an operation identifier, a linked reference and a destination for a corresponding cloned file.

18. The computer system of claim 15, wherein the at least one processor is configured to rename every modified cloned file of the file system transaction to the name of the respective original file.

19. The computer system of claim 18, wherein the at least one processor is configured to abort the file system transaction when every modified cloned file of the file system transaction is not renamed and deleting the cloned files.

20. The computer system of claim 18, wherein the at least one processor is configured to create the set of cloned files of the original existing files specified in the file system transaction without copying stored contents of the original existing files.

* * * * *